(12) United States Patent
Fink

(10) Patent No.: US 11,028,932 B2
(45) Date of Patent: Jun. 8, 2021

(54) PRESSURE RELIEF VALVE

(71) Applicant: FMC Technologies, Inc., Houston, TX (US)

(72) Inventor: Daniel R. Fink, Porter, TX (US)

(73) Assignee: FMC Technologies, Inc., Houston, TX (US)

(*) Notice: Subject to any disclaimer, the term of this patent is extended or adjusted under 35 U.S.C. 154(b) by 0 days.

(21) Appl. No.: 16/332,338

(22) PCT Filed: Sep. 26, 2017

(86) PCT No.: PCT/US2017/053558
§ 371 (c)(1),
(2) Date: Mar. 11, 2019

(87) PCT Pub. No.: WO2018/058146
PCT Pub. Date: Mar. 29, 2018

(65) Prior Publication Data
US 2019/0219186 A1 Jul. 18, 2019

Related U.S. Application Data

(60) Provisional application No. 62/399,984, filed on Sep. 26, 2016.

(51) Int. Cl.
*G05D 11/00* (2006.01)
*F16K 17/04* (2006.01)
(Continued)

(52) U.S. Cl.
CPC ........ *F16K 17/0473* (2013.01); *E21B 34/00* (2013.01); *E21B 34/02* (2013.01);
(Continued)

(58) Field of Classification Search
CPC .................. Y10T 137/2605; Y10T 137/2635
See application file for complete search history.

(56) References Cited

U.S. PATENT DOCUMENTS 618,903 A * 2/1899 Prince ................... F15B 1/027
137/115.23
2,665,704 A * 1/1954 Kanuch ............. F15B 13/0417
137/110

(Continued)

FOREIGN PATENT DOCUMENTS

CN 103335142 A 10/2013
EP 2 489 909 8/2012

*Primary Examiner* — Robert K Arundale
(74) *Attorney, Agent, or Firm* — Henry C. Query, Jr.

(57) ABSTRACT

A pressure relief valve includes a valve body having a main bore, an inlet bore which is connected to the main bore, an outlet bore which extends through a side of the valve body, and a valve bore which connects the inlet bore with the outlet bore. A valve member is positioned in the valve bore and is movable between a closed position in which a fluid in the inlet bore is prevented from flowing into the outlet bore and an open position in which the fluid in the inlet bore is permitted to flow into the outlet bore. The valve member is movable from the closed position to the open position in response to an overpressure event in the main bore. The valve body further includes a return bore which connects the inlet bore with the main bore.

20 Claims, 11 Drawing Sheets

(51) Int. Cl.
  *F16K 17/168*   (2006.01)
  *E21B 34/02*   (2006.01)
  *E21B 34/00*   (2006.01)
  *E21B 43/26*   (2006.01)

(52) U.S. Cl.
  CPC ............ *F16K 17/04* (2013.01); *F16K 17/168* (2013.01); *E21B 43/26* (2013.01); *Y10T 137/2635* (2015.04)

(56) References Cited

U.S. PATENT DOCUMENTS

| | | | |
|---|---|---|---|
| 3,344,805 A | | 10/1967 | Wapner |
| 3,482,405 A | * | 12/1969 | Sansevero, Jr. ............ F02K 9/92 |
| | | | 60/263 |
| 3,945,205 A | * | 3/1976 | Atago ........................ F01N 3/22 |
| | | | 60/289 |
| 4,325,406 A | * | 4/1982 | Bron .................... G05D 16/166 |
| | | | 137/492.5 |
| 4,457,211 A | * | 7/1984 | Risk .......................... B66B 1/24 |
| | | | 137/115.13 |
| 5,642,752 A | | 7/1997 | Yokota et al. |
| 2008/0066463 A1 | * | 3/2008 | Davison ................ B60T 13/162 |
| | | | 60/459 |
| 2015/0027557 A1 | | 1/2015 | Crawford |
| 2015/0308579 A1 | | 10/2015 | Hagmann |

\* cited by examiner

PRESSURE RELIEF VALVE

The present application is based on and claims priority from U.S. Provisional Patent Application No. 62/399,984 filed on Sep. 26, 2016.

The present disclosure is directed a pressure relieve valve. More specifically, the disclosure is directed to a pressure relief valve which comprises a fluid circulation feature to regulate the temperature of the fluid flowing through the valve and a vent feature to facilitate rapid resetting of the valve member.

BACKGROUND OF THE DISCLOSURE

Pressure relief valves are commonly used in the hydrocarbon production industry to protect flow lines and associated equipment from overpressure events. Such valves normally include an inlet which is connected to the flow line, an outlet which is connected to a vent line and a valve member which is movable between a closed position in which the outlet is isolated from the inlet and an open position in which the outlet is open to the inlet. When the pressure in the flow line exceeds a predetermined maximum value, the valve member opens to allow the fluid in the flow line to flow through the outlet and into the vent line.

In hydraulic fracturing operations, one or more pressure relief valves are typically positioned in the main flowline leading to the fracturing tree in order to prevent pressure surges that could damaging the fracturing equipment as well as the hydrocarbon formation. In certain environments where temperatures are relatively low, the fracturing fluid may tend to freeze, thus requiring additional time and effort to un-freeze the fluid before the fracturing operation can continue. Also, if the fracturing fluid in the flow line remains static for even a brief time, sand in the fracturing fluid may settle in the pressure relief valve and, once flow is restored, erode certain components of the pressure relief valve.

SUMMARY OF THE DISCLOSURE

In accordance with the present disclosure, a pressure relief valve is provided which comprises a valve body which includes a main bore having an inlet end and an outlet end, an inlet bore which is connected to the main bore, an outlet bore which extends through a side of the valve body, and a valve bore which connects the inlet bore with the outlet bore. A valve member is positioned in the valve bore and is movable between a closed position in which a fluid in the inlet bore is prevented from flowing into the outlet bore and an open position in which the fluid in the inlet bore is permitted to flow into the outlet bore. The valve member is movable from the closed position to the open position in response to an overpressure event in the main bore. Also, the valve body further comprises a return bore which connects the inlet bore with the main bore.

In one aspect, the pressure relief valve further comprises a flow restrictor which is located in the main bore between the inlet bore and the return bore. The flow restrictor may comprises, e.g., a reduced diameter constriction in the main bore.

In another aspect, the valve body further comprises a vent bore which is connected between the inlet bore and the outlet bore, and the pressure relief valve further comprises a first closure device which is positioned in the vent bore and a second closure device which is positioned in the inlet bore between the main bore and the vent bore. In operation of the pressure relief valve, pressure in the valve bore is vented through the vent bore and the outlet bore by closing the second closure device and opening the first closure device.

In a yet another aspect, the vent bore is connected to the inlet bore via the return bore and the pressure relief valve further comprises a third closure device which is positioned in the return bore between the main bore and the vent bore. In operation of the pressure relief valve, pressure in the valve bore is vented through the vent bore and the outlet bore by closing the second and third closure devices and opening the first closure device.

In further aspect, the valve body comprises a generally rectangular block configuration. In this embodiment, the main bore may extend generally horizontally through the body, the inlet bore may extend generally vertically through the body from the main bore, the valve bore may extend generally vertically through the body from an end of the inlet bore opposite the main bore, and the outlet bore may extend generally horizontally through the body from the vale bore. Also, the return bore may extend generally vertically through the valve body from the main bore and be connected to the inlet bore by a generally horizontally extending cross bore. In addition, the vent bore may extend generally vertically through the valve body from the outlet bore and be connected to the inlet bore by the cross bore. Further, at least one of the valve bore and the vent bore may be formed coaxially with the inlet bore and the return bore, respectively.

In another aspect of the disclosure, at least one of the main bore and the outlet bore may comprise a bore liner. Also, at least one of the inlet bore, the return bore, the cross bore and the vent bore may comprise a bore liner.

The present disclosure is also directed to a pressure relief valve comprising a valve body which includes a main bore having an inlet end and an outlet end, an inlet bore which is connected to the main bore, an outlet bore which extends through a side of the valve body, and a valve bore which connects the inlet bore with the outlet bore. A valve member is positioned in the valve bore and is movable between a closed position in which a fluid in the inlet bore is prevented from flowing into the outlet bore and an open position in which the fluid in the inlet bore is permitted to flow into the outlet bore. The valve member is movable from the closed position to the open position in response to an overpressure event in the main bore. In addition, the valve body comprises a generally rectangular block configuration.

In one aspect, the main bore extends generally horizontally through the body, the inlet bore extends generally vertically through the body from the main bore, the valve bore extends generally vertically through the body from an end of the inlet bore opposite the main bore, and the outlet bore extends generally horizontally through the body from the vale bore.

In another aspect, the valve body further comprises a return bore which connects the inlet bore with the main bore. The return bore may extend generally vertically through the valve body from the main bore and be connected to the inlet bore by a generally horizontally extending cross bore. In addition, the valve body may comprise a vent bore which is connected between the inlet bore and the outlet bore. The vent bore may extend generally vertically through the valve body from the outlet bore and be connected to the inlet bore by the cross bore. Further, at least one of the valve bore and the vent bore is formed coaxially with the inlet bore and the return bore, respectively.

In yet another aspect of the disclosure, the valve body further comprises a return bore which connects the inlet bore with the main bore. Also, the pressure relief valve may comprise flow restrictor which is located in the main bore between the inlet bore and the return bore. the flow restrictor may comprise, e.g., a reduced diameter constriction in the main bore.

In a further aspect of the disclosure, the valve body also comprises a vent bore which is connected between the inlet bore and the outlet bore, and the pressure relief valve further comprises a first closure device which is positioned in the vent bore and a second closure device which is positioned in the inlet bore between the main bore and the vent bore. In operation of the pressure relief valve, pressure in the valve bore is vented through the vent bore and the outlet bore by closing the second closure device and opening the first closure device.

In another aspect, the valve body further comprises a return bore which connects the inlet bore with the main bore. The vent bore is connected to the inlet bore via the return bore and the pressure relief valve further comprises a third closure device which is positioned in the return bore between the main bore and the vent bore. In operation of the pressure relief valve, pressure in the valve bore is vented through the vent bore and the outlet bore by closing the second and third closure devices and opening the first closure device.

The present disclosure is further directed to method of operating a pressure relief valve. The method comprises the steps of directing a fluid through a main bore of a valve body; circulating at least a portion of the fluid from the main bore, through the valve body and back into the main bore; and upon the occurrence of an overpressure event, opening a valve member coupled to the valve body to vent the fluid in the main bore through an outlet bore of the valve body.

In one aspect, the step of circulating at least a portion of the fluid through the valve body comprises directing the fluid from the main bore through a return bore which is connected between an inlet bore of the valve body and the main bore.

In another aspect, the method further comprises, after the step of opening the valve member to vent the fluid in the main bore through the outlet bore, the steps of isolating a valve bore of the valve body and the outlet bore from the main bore, wherein the valve member is at least partially positioned in the valve bore; venting the fluid in the valve bore through the outlet bore; closing the valve member to isolate the inlet bore from the outlet bore; and opening the inlet bore and the return bore to the main bore.

In yet another aspect, the step of venting the fluid in the valve bore through the outlet bore comprises directing the fluid through a vent bore which is connected between the inlet bore and the valve bore.

In a further aspect, the method also comprises, after the fluid is vented from the valve bore, the step of isolating the outlet bore from the vent bore.

Thus, the pressure relief valve of one embodiment of the disclosure includes one or bores for circulating fluid in the main bore through the valve body when the valve member is in the closed position. Among other benefits, this function will prevent the fluid in the main bore from freezing in cold weather and inhibit sand from settling in the inlet bore and eroding the valve member during activation of the pressure relief valve.

The pressure relief valve of another embodiment of the disclosure comprises one or more bores for venting pressure from the valve bore after an overpressure event has been resolved. This will effectively reduce the pressure in the valve bore to atmospheric pressure and thereby render the operation of resetting the valve member to its closed position relatively easy, even with significant pressure in the main bore.

The pressure relief valve of a further embodiment includes a valve body which has a generally rectangular block configuration. Such a configuration provides a robust structure which is relatively easy to handle. In addition, by orienting the various bores either vertically or horizontally within the valve body, and by extending the bores to the sides of the valve body, the internal structure of the valve body is relatively easy to machine, thus making the pressure relief valve simpler and less expensive to manufacture.

These and other objects and advantages of the present disclosure will be made apparent from the following detailed description, with reference to the accompanying drawings. In the drawings, the same reference numbers may be used to denote similar components in the various embodiments.

BRIEF DESCRIPTION OF THE DRAWINGS

FIG. 10 is a schematic representation similar to FIG. 9 but with the fluid circulation feature turned on;

DETAILED DESCRIPTION

Figure 1:
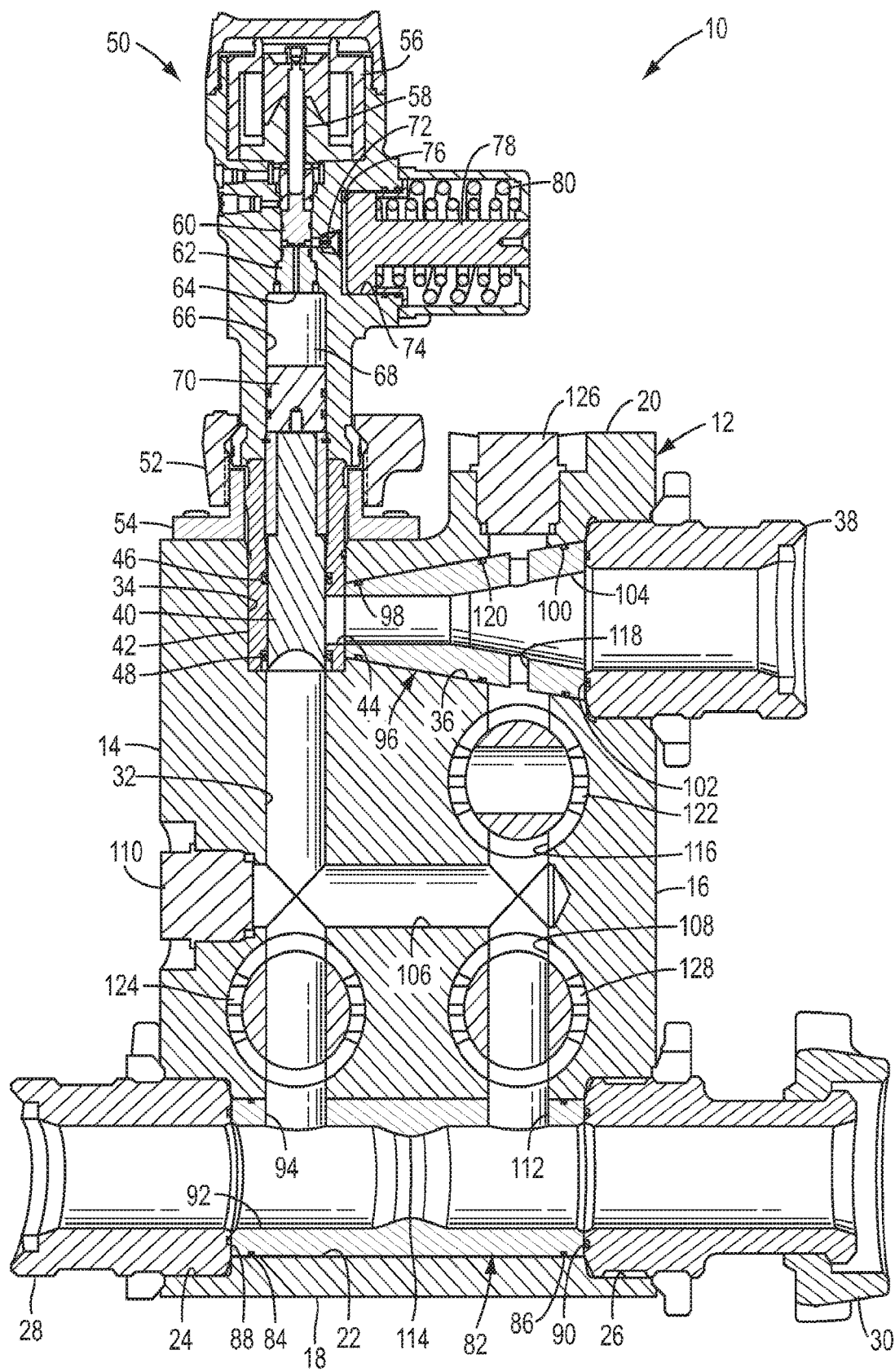
FIG. 1 is a cross sectional representation of an embodiment of the pressure relief valve of the present disclosure which comprises several optional features.

A first embodiment of the pressure relief valve of the present disclosure, comprising several optional features which define further embodiments of the disclosure, is shown in FIG. 1. The pressure relief valve of this embodiment, generally 10, comprises a valve body 12 which is connectable to a flowline (not shown) that may be connected between, e.g., a fracking manifold and a fracking wellhead, neither of which is depicted in FIG. 1. In an exemplary embodiment of the disclosure, the valve body 12 may comprise, e.g., a generally rectangular metal block which in cross section includes opposite first and second sides 14, 16, a bottom side 18 and a top side 20.

A main bore 22 extends through the valve body 12 between the first and second sides 14, 16 near the bottom side 18. The main bore 22 includes an inlet end 24 adjacent the first side 14 and an outlet end 26 adjacent the second side 16. An inlet fitting 28 may be connected to the inlet end 24 to facilitate connecting a first section of the flowline (not shown) to the main bore 22. Likewise, an outlet fitting 30 may be connected to the outlet end 26 to facilitate connecting a second section of the flowline (not shown) to the main bore 22. The inlet and outlet fittings 28, 30 may comprise, e.g., suitable Weco® end connection fittings which may, for example, be configured to be threaded into corresponding counterbores in the inlet and outlet ends 24, 26, respectively.

In a first embodiment of the disclosure, the valve body 12 also includes an inlet bore 32 which is connected to the main bore 22, a valve bore 34 which is connected to the inlet bore, and an outlet bore 36 which extends from the valve bore through a side of the valve body. In the exemplary embodiment of the disclosure shown in FIG. 1, the inlet bore 32 extends generally vertically from the main bore 22 toward the top side 20 of the valve body, the valve bore 34 extends coaxially from the inlet bore through the top side of the valve body 12, and the outlet bore 36 extends generally laterally from the valve bore through the second side 16 of the valve body. If desired or required by a particular application, an outlet fitting 38 may be connected to the outlet bore 36 to facilitate connecting the outlet bore to an exhaust line (not shown). The outlet fitting 38 may comprise, e.g., a suitable Weco® end connection fitting which may, for example, be configured to be threaded into a corresponding counterbore in the end of the outlet bore 36.

The pressure relief valve 10 includes a valve member 40 which is movably positioned in the valve bore 34 to control the flow of fluid from the inlet bore 32 to the outlet bore 36. In one embodiment of the disclosure, the valve member 40 may comprise a poppet which is slidably received in a cylindrical poppet cage 42 that is positioned in, and preferably also suitably sealed to, the valve bore 34. In this example, the poppet cage 42 includes a flow port 44 which is connected to the outlet bore 36, and the poppet 40 is sealed to the poppet cage by a pair of suitable seal rings 46, 48 positioned above and below the flow port, respectively. In the closed position of the pressure relieve valve 10, which is the position shown in FIG. 1, the poppet 40 is positioned across the flow port 44. In this position, fluid in the inlet bore 32 is prevented from flowing into the outlet bore 36. In the open position of the pressure relief valve 10, the bottom end of the poppet 40 is positioned above the flow port 44. In this position, fluid in the inlet bore 32 is permitted to flow through the flow port 44 and into the outlet bore 36. This arrangement of a valve member for selectively sealing between an inlet bore and an outlet bore is described more fully in applicant's U.S. patent application Ser. No. 14/452,193, which is hereby incorporated herein by reference.

The valve member 40 may be controlled by a solenoid operated pilot valve 50. In the exemplary embodiment of the disclosure shown in FIG. 1, the pilot valve 50 is connected to the top side 20 of the valve body 12 over the valve bore 34. The pilot valve 50 may be connected to the valve body 12 by any suitable means, such as with a conventional Weco® wing union 52 which is connected to a threaded fitting 54 that is bolted to the top side 20 of the valve body.

The structure and operation of the pilot valve 50 are as described in U.S. patent application Ser. No. 14/452,193. Briefly, the pilot valve 50 includes a solenoid 56 which comprises a plunger rod 58 that is connected to a pilot piston 60. The pilot piston 60 is configured to seal against a seat member 62 in order to close off a through bore 64 which extends axially through the seat member. The through bore 64 is connected to an enlarged diameter pilot bore 66 which defines a fluid chamber 68 that is filled with a substantially non-compressible fluid, such as hydraulic fluid. The bottom of the fluid chamber 68 is defined by a movable main piston 70 which is sealed to the pilot bore 66 and is positioned against the top of the valve member 40. When the pilot piston 60 is spaced apart from the seat member 62, the top of the through bore 64 is connected through a fill port 72 to a relief bore 74. The relief bore 74 defines a relief chamber 76 which is closed by a movable relief piston 78. The relief piston 78 is sealed to the relief bore 74 and is biased toward the fill port 72 by a spring member 80.

In the closed position of the pilot valve 50, the solenoid 56 will maintain the pilot piston 60 against the seat member 62 in order to seal off the through bore 64 and thereby trap the hydraulic fluid in the fluid chamber 68. With the pressure relief valve 10 in the closed position, i.e., with the valve member 40 positioned across the flow port 44, this trapped volume of hydraulic fluid in the fluid chamber 68 will maintain the main piston 70 against the top of the valve member and thereby prevent fluid pressure in the main bore 22 from moving the valve member to its open position.

Figure 3:
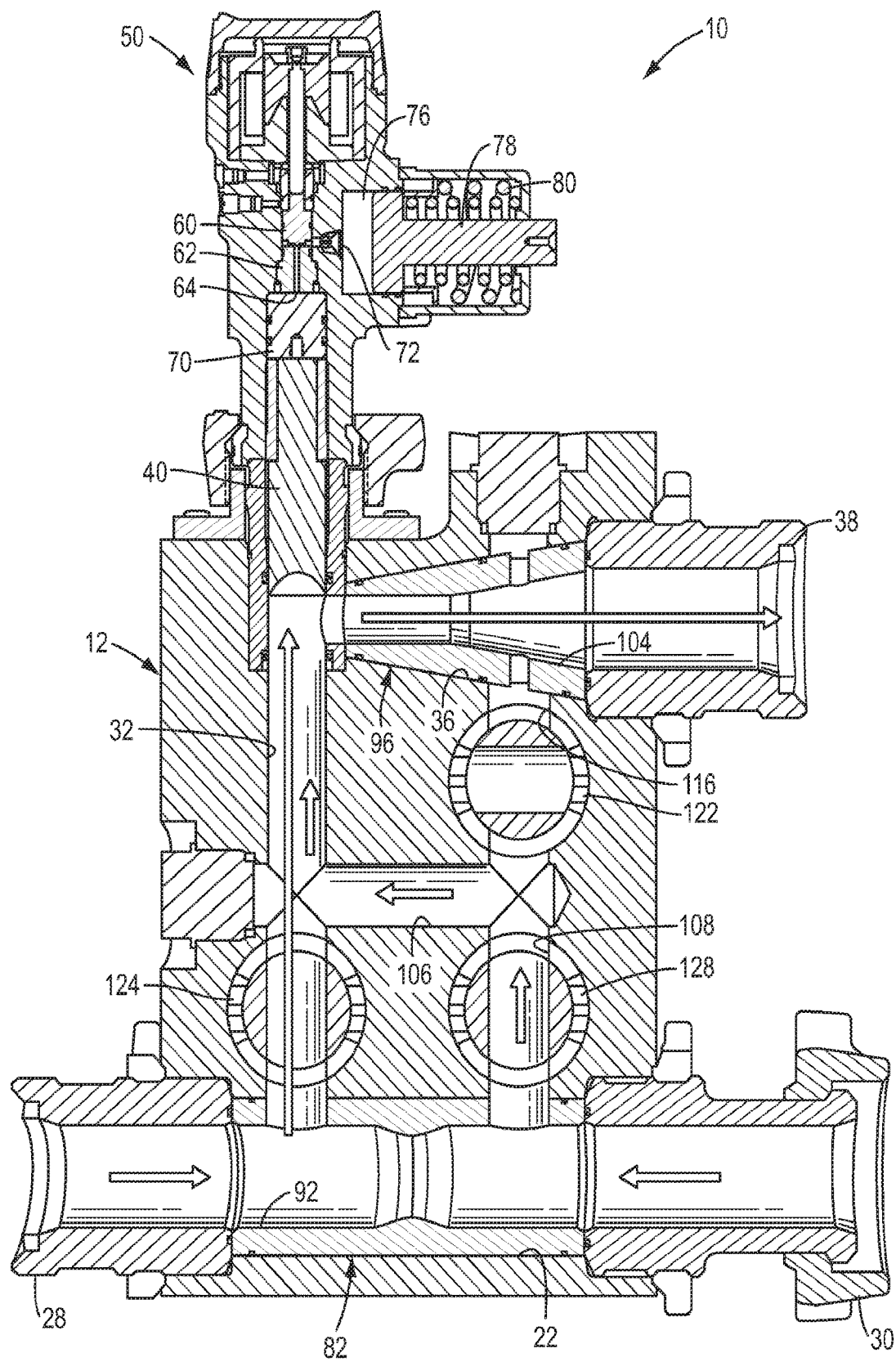
FIG. 3 is a cross sectional representation of the pressure relief valve of FIG. 1 shown in its pressure relief mode.

When an overpressure event occurs in the main bore 22, the solenoid 56 will lift the pilot piston 60 away from the seat member 62 (or will allow the pilot piston to be forced by fluid pressure off of the seat member), which will open the through bore 64 to the relief chamber 76. With the hydraulic fluid no longer trapped in the fluid chamber 68, pressure in the main bore 22 will force the valve member 40 upwards, which in turn will move the main piston 70 upward into the fluid chamber and force the hydraulic fluid through the through bore 64 and the fill port 72 and into the relief chamber 76. As the hydraulic fluid flows out of the fluid chamber 68 and into the relief chamber 76, the relief piston 78 will move to the right (as viewed in FIG. 1) against the force of the spring member 80 until the valve member 40 reaches its fully open position (as shown in FIG. 3). At this point, fluid in the main bore 22 will flow through the inlet bore 32 and out of the pressure relief valve 10 through the outlet bore 36 to thereby relieve the overpressure in the main bore.

When the overpressure event has been resolved and the pressure in the flow bore 22 has dropped to below a predetermined level, the spring member 80 will force the hydraulic fluid out of the relief chamber 76 and back into the fluid chamber 68 until the valve member 40 reaches its closed position. The solenoid 56 will then be activated to move the pilot piston 60 against the seat member 62 in order to seal off the through bore 64 and once again trap the hydraulic fluid in the fluid chamber 68, which as discussed above will maintain the valve member 40 in its closed position against the pressure in the main bore 22.

In accordance with another embodiment of the disclosure, one or both of the main bore 22 and the outlet bore 36 may be provided with bore liners in order to extend the useable life of the valve body 12. Referring still to FIG. 1, the pressure relieve valve 10 may include a cylindrical main bore liner 82 which is positioned in the main bore 22 and secured therein by suitable means, such as by virtue of being trapped between the inlet and outlet fittings 28, 30. The main bore liner 82 may be sealed to the main bore 22 by a pair of suitable seals 84, 86, and may also be sealed to the inlet and outlet fittings 28, 30 by respective suitable seals 88, 90. In this embodiment, the main bore liner 82 defines a main flowpath 92 which is fluidly connected to the flowline (not shown) by the inlet and outlet fittings 28, 30, and an inlet port 94 which extends between the main flowpath and the inlet bore 32.

The pressure relieve valve 10 may also include an outlet bore liner 96 which is positioned in the outlet bore 36 and secured therein by suitable means, such as by virtue of being trapped between the poppet cage 42 and the outlet fitting 38. The outlet bore liner 96 may be sealed to the outlet bore 96 by a pair of suitable seals 98, 100, and may also be sealed to the outlet fitting 38, 38 by a suitable seal 102. In this embodiment, the outlet bore liner 96 includes a outlet flowpath 104 which is fluidly connected to the exhaust line (not shown) by the outlet fitting 38.

In accordance with yet another embodiment of the present disclosure, the pressure relief valve 10 includes means for circulating fluid in the main bore 22 through the valve body 12 when the valve member 40 is in the closed position. Such a function may be desired, for example, to prevent the fluid in the main bore 22 from freezing in cold weather or to prevent sand from settling in the inlet bore 32 and eroding the valve member 40 during activation of the pressure relief valve. Referring still to FIG. 1, the means for circulating fluid in the main bore 22 through the valve body 12 may comprise a cross bore 106 which is connected to the inlet bore 32 and a return bore 108 which is connected between the cross bore and the main bore 22. It should be understood that the cross bore 106 and the return bore 108 could comprise separate sections of the same bore. Therefore, unless the context otherwise requires, the term "return bore" can be construed to comprise both the cross bore 106 and the return bore 108.

In order to simplify the manufacture of the valve body 12, the cross bore 106 may extend laterally through a side of the valve body, such as the first side 14, and be sealed by a suitable plug member 110. Also, if as shown in FIG. 1 the pressure relief valve 10 includes a main bore liner 82, the main bore liner will comprise a return port 112 for connecting the return bore 108 with the main flowpath 92.

The circulating means may also comprise means for directing at least a portion of the fluid in the main bore 22 through the inlet bore 32, the cross bore 106 and the return bore 108 and back into the main bore. In the exemplary embodiment of the disclosure shown in FIG. 1, the means for directing at least a portion of the fluid in the main bore 22 through the inlet bore 32, the cross bore 106 and the return bore 108 and back into the main bore may include a reduced diameter constriction 114 which is formed in the main bore 22 at a location between the inlet bore and the return bore. If as shown in FIG. 1 the pressure relief valve 10 includes a main bore liner 82, the constriction 114 would be formed in the main flowpath 92. In this embodiment of the disclosure, the constriction 114 operates to create a pressure difference between the upstream side of the constriction and the downstream side of the constriction which will cause at least a portion of the fluid in the main bore 22 to flow through the inlet bore 32, the cross bore 106, the return bore 108 and back into the main bore. This action will increase the temperature of the fluid and prevent the fluid from freezing in cold weather.

As discussed above, after an overpressure event has been resolved and the pressure in the main bore 22 drops to below a predetermined level, the spring member 80 in the pilot valve 50 will force the relief piston 78 to the left (as viewed in FIG. 1) and thereby drive the hydraulic fluid out of the relief chamber 76 and back into the fluid chamber 68 to reset the valve member 40 to its closed position. During this operation, it is desirable that the pressure in the main bore 22 be as low as possible after the overpressure event has been resolved so that the force generated by the spring member 80 does not have to be unduly large, which could inhibit the rapid opening of the valve member 40 if an overpressure event occurs. However, after an overpressure event occurs, the normal pressure in the main bore 22 may still be relatively high.

In accordance with a further embodiment of the disclosure, therefore, the pressure relief valve 10 comprises means for venting the pressure from the inlet bore 32 after an overpressure event has been resolved in order to facilitate resetting the valve member 40 to its closed position. In the embodiment of the disclosure shown in FIG. 1, for example, the means for venting the pressure from the inlet bore 32 includes a vent bore 116 which is connected between the inlet bore and the outlet bore 36. In this embodiment, the vent bore 116 is connected to the inlet bore 32 via the cross bore 106. However, the vent bore 116 may alternatively comprise a separate bore which extends through the valve body 12 between the inlet bore 32 and the outlet bore 36 independently of the cross bore 106. If as shown in FIG. 1 the pressure relief valve 10 includes a outlet bore liner 96, the outlet bore liner will comprise at least one vent port 118 for connecting the vent bore 116 to the outlet flowpath 104. Also, a suitable seal 120 will ideally be provided between the outlet bore 36 and the outlet bore liner 96 to, in conjunction with the seal 100, sealingly connect the vent bore 116 to the vent port 118.

The means for venting pressure from the inlet bore 32 also includes means for selectively closing the vent bore 116 during normal operation of the pressure relief valve 10 and means for selectively isolating the main bore 22 from the inlet bore during resetting of the valve member 40 after an overpressure event has been resolved. As shown in FIG. 1, the means for selectively closing the vent bore 116 during normal operation of the pressure relief valve 10 includes a first closure device 122 which is positioned in the vent bore 116, and the means for selectively isolating the main bore 22 from the inlet bore 32 during resetting of the valve member 40 includes a second closure device 124 which is positioned in the inlet bore either between the main bore and the intersection of the inlet bore with the vent bore or, if as shown in FIG. 1 the inlet bore is connected to the vent bore via the cross bore 106, between the main bore and the cross bore. The first and second closure devices 122, 124 may comprise any suitable manual or electrically or hydraulically actuated valve members which are effective for selectively sealing their respective bores. In one embodiment of the disclosure, the first and second closure devices 122, 124 are hydraulically actuated plug valves which are controlled in a manner that will be discussed below.

During normal operation of the pressure relief valve 10, the first closure device 122 will be closed and the second closure device 124 will be open. If an overpressure event occurs in the main bore 22, the valve member 40 will open as described above and the pressure in the main bore will flow through the inlet bore 32 and out of the outlet bore 36. After the overpressure event has been resolved, the second closure device 124 will be closed to isolate the inlet bore 32 from the main bore 22, and the first closure device 122 will be opened to vent the pressure in the inlet bore through the vent bore 116 and the outlet bore 36. This will reduce the pressure in the inlet bore 32 to near atmospheric pressure, which will allow the spring member 80 in the pilot valve 50 to reseat the valve member 40.

As shown in FIG. 1, in order to simplify the manufacture of the valve body 12, the vent bore 116 and the return bore 108 may comprise respective parts of a single bore which extends generally vertically from the main bore 22 through the top side 20 of the valve body and is sealed by a suitable plug member 126. In this event, and if as shown in FIG. 1 the inlet bore 32 is connected to the vent bore 116 by the cross bore 106, the pressure relief valve 10 includes means for selectively closing the return bore 108 during venting of the inlet bore 32. Such means may include, e.g., a third closure device 128 which is positioned in the return bore 108 between the cross bore 106 and the main bore 22. The third closure device 128 may comprise any suitable manual or electrically or hydraulically actuated valve member which is effective for selectively sealing the return bore 108. In one embodiment of the disclosure, the third closure device 128 is a hydraulically actuated plug valve which is controlled in a manner that will be discussed below. It should be understood that, if the pressure relief valve 10 does not comprise the above-described means for circulating fluid in the main bore 22 through the valve body 12 when the valve member 40 is in the closed position, then the return bore 108 may be omitted and the third closure device 128 will not be necessary.

Although not depicted in the drawings, one or more of the inlet bore 32, the return bore 108, the cross bore 106 and the vent bore 116 may be provided with a corresponding erosion reducing liner, which may be similar, e.g. to the bore liners 82, 96 for the main bore 22 and the outlet bore 36, respectively.

Several embodiments of the present disclosure have now been described in which the pressure relief valve 10 includes several optional features, such as, e.g., the means for circulating fluid in the main bore 22 through the valve body 12 when the valve member 40 is in the closed position, and the means for venting pressure from the inlet bore 32 after an overpressure event has been resolved. The operation of an embodiment of a pressure relief valve 10 which includes the combination of these features will now be described with reference to FIGS. 2-5.

Figure 2:
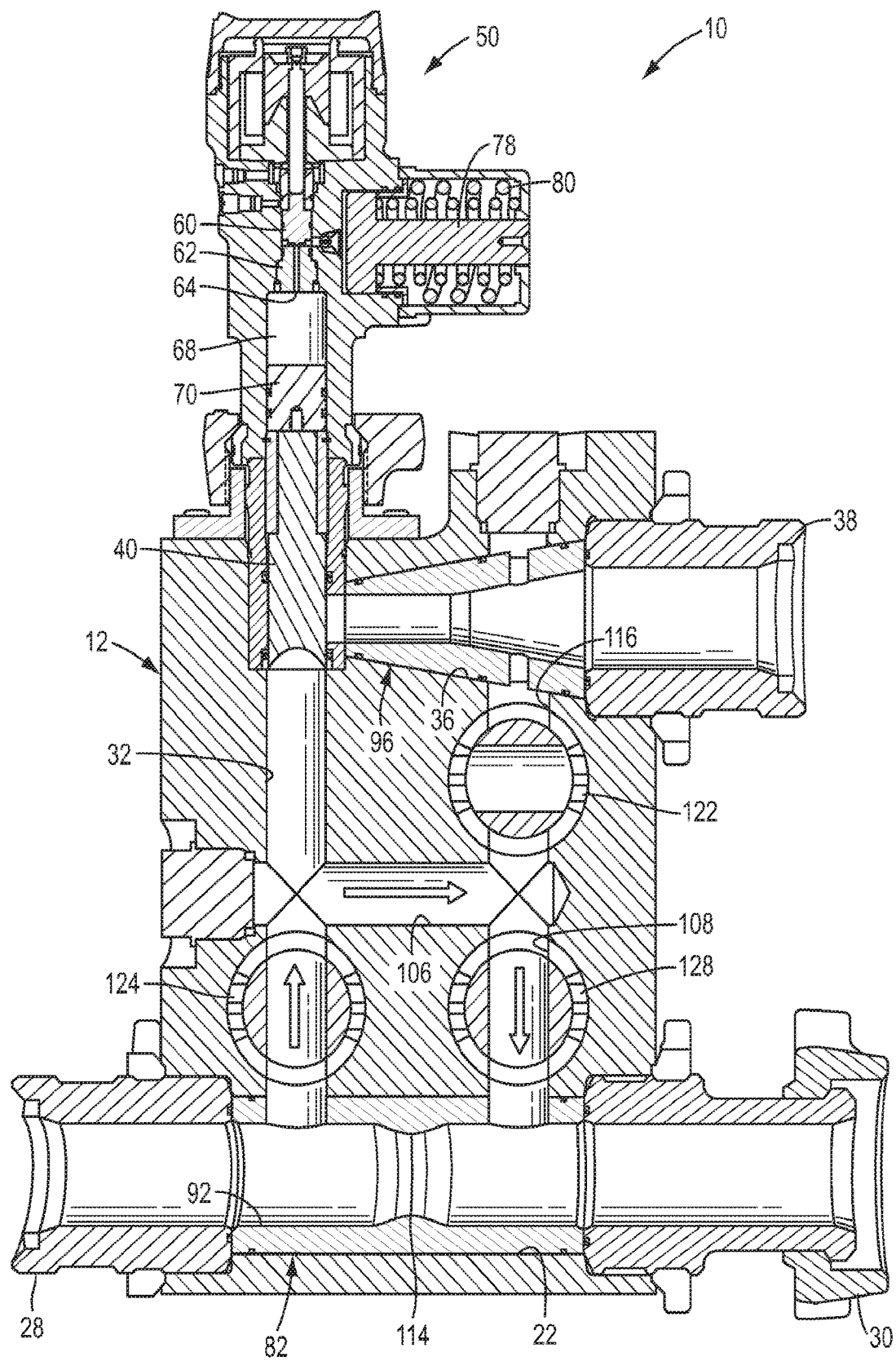
FIG. 2 is a cross sectional representation of the pressure relief valve of FIG. 1 shown in its normal operating mode.

As shown in FIG. 2, during normal operation of the pressure relief valve 10 (i.e., when fluid at a pressure below a predetermined overpressure level is flowing through the main bore 22 (or the main flowpath 92)), the valve member 40 will be is closed, the second and third closure devices 124, 128 will be open, and the first closure device 122 will be closed. In this condition, the constriction 114 in the main bore 22 (or in the main bore liner 82) will created a pressure difference which will cause at least a portion of the fluid to flow through the inlet bore 32, the cross bore 106 and the return bore 108 and back into the main bore (or the main bore liner 82) downstream of the constriction, as indicated by the arrows in FIG. 2. This action will help regulate the temperature of the fluid by, e.g., preventing the fluid from freezing in cold weather. Also, the pilot valve 50 will maintain the pilot piston 60 seated against the seat member 62 to trap the hydraulic fluid in the fluid chamber 68 and thereby maintain the closure member 40 in the closed position against an opposing force created by the pressure in the main bore 22 (or the main flowpath 92).

Referring to FIG. 3, if an overpressure event occurs (i.e., if the pressure in the main bore 22 (or in the main flowpath 92) reaches the predetermined overpressure level), the pilot valve 50 will release the pilot piston 60 from engagement with the seat member 62 and thereby allow the main piston 70 to displace the hydraulic fluid from the fluid chamber 68, through the through bore 64 and the fill port 76 and into the relief chamber 76 as the valve member 40 is forced upwards (as viewed in FIG. 3) by the pressure in the main bore 22 (or the main flowpath 92). As the valve member 40 reaches it fully open position, fluid in the main bore 22 (or the main flowpath 92) will be released through the inlet bore 32, the return bore 108, the cross bore 106 and the outlet bore 36 (or the outlet flowpath 104) and exit the pressure relief valve 10, as indicated by the arrows in FIG. 3, to relieve the pressure in the main bore (or the main flowpath).

Figure 4:
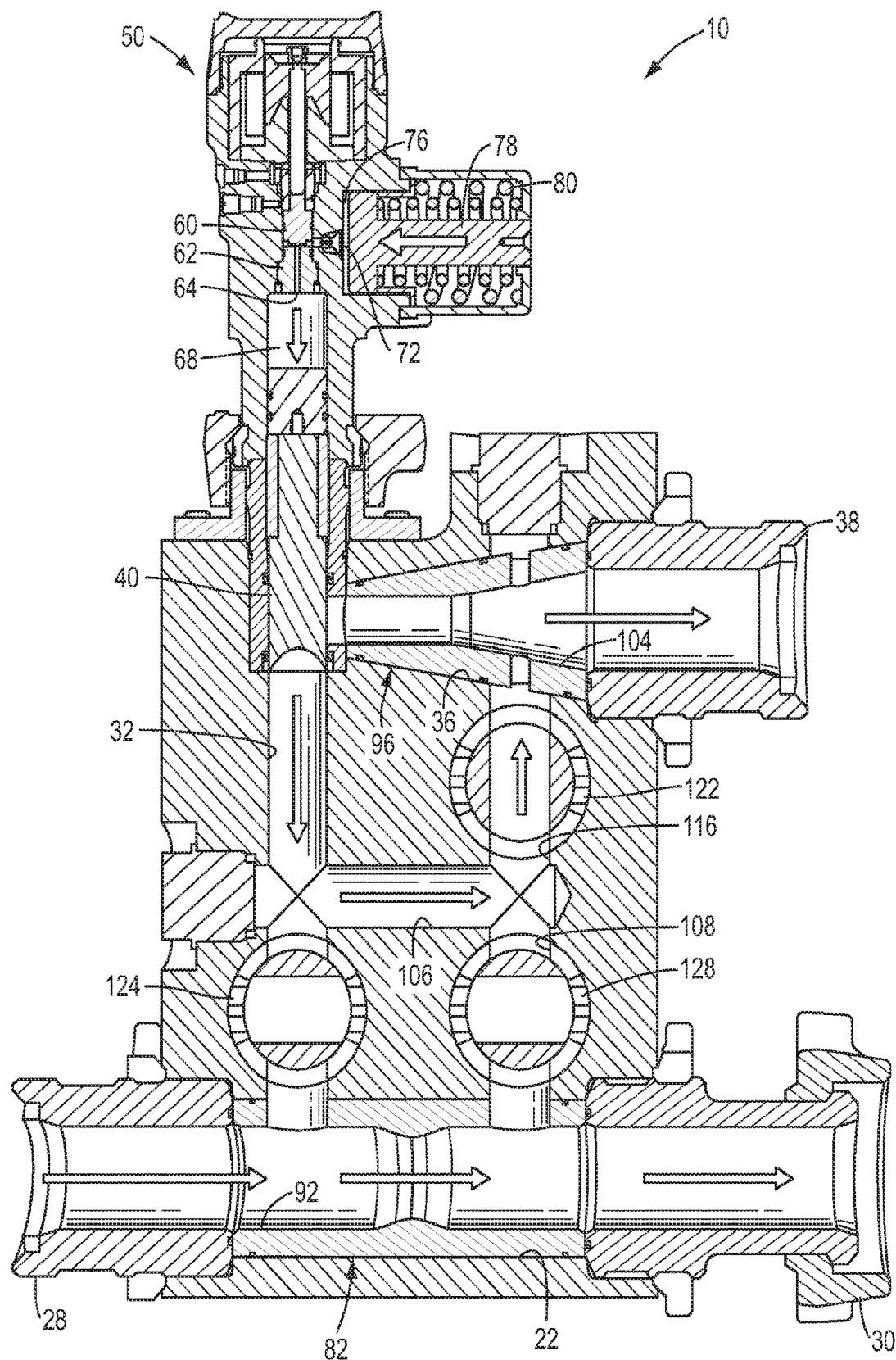
FIG. 4 is a cross sectional representation of the pressure relief valve of FIG. 1 shown subsequent to the pressure relief mode.

Referring to FIG. 4, after the overpressure event has been resolved (e.g., after a blockage in the flowline to which the pressure relief valve 10 is connected has been cleared), the second and third closure devices 124, 128 will be closed to isolate the inlet bore 32 and the vent bore 116 from the main bore 22 (or the main flowpath 92), and the first closure device 122 will be opened to vent the pressure in the inlet bore through the cross bore 106 and the vent bore and into the outlet bore 36 (or the outlet flowpath 104), as indicated by the arrows in FIG. 4. This will effectively reduce the pressure in the inlet bore 32 to atmospheric pressure. With the pilot valve 50 still in the open position, the spring member 80 will force the relief piston 78 to the left (as viewed in FIG. 4) and thereby displace the hydraulic fluid from the relief chamber 76, through the fill port 72 and the through bore 64 and back into the fluid chamber 68. The hydraulic fluid entering the fluid chamber 68 will in turn force the valve member 40 into its closed position.

Figure 5:
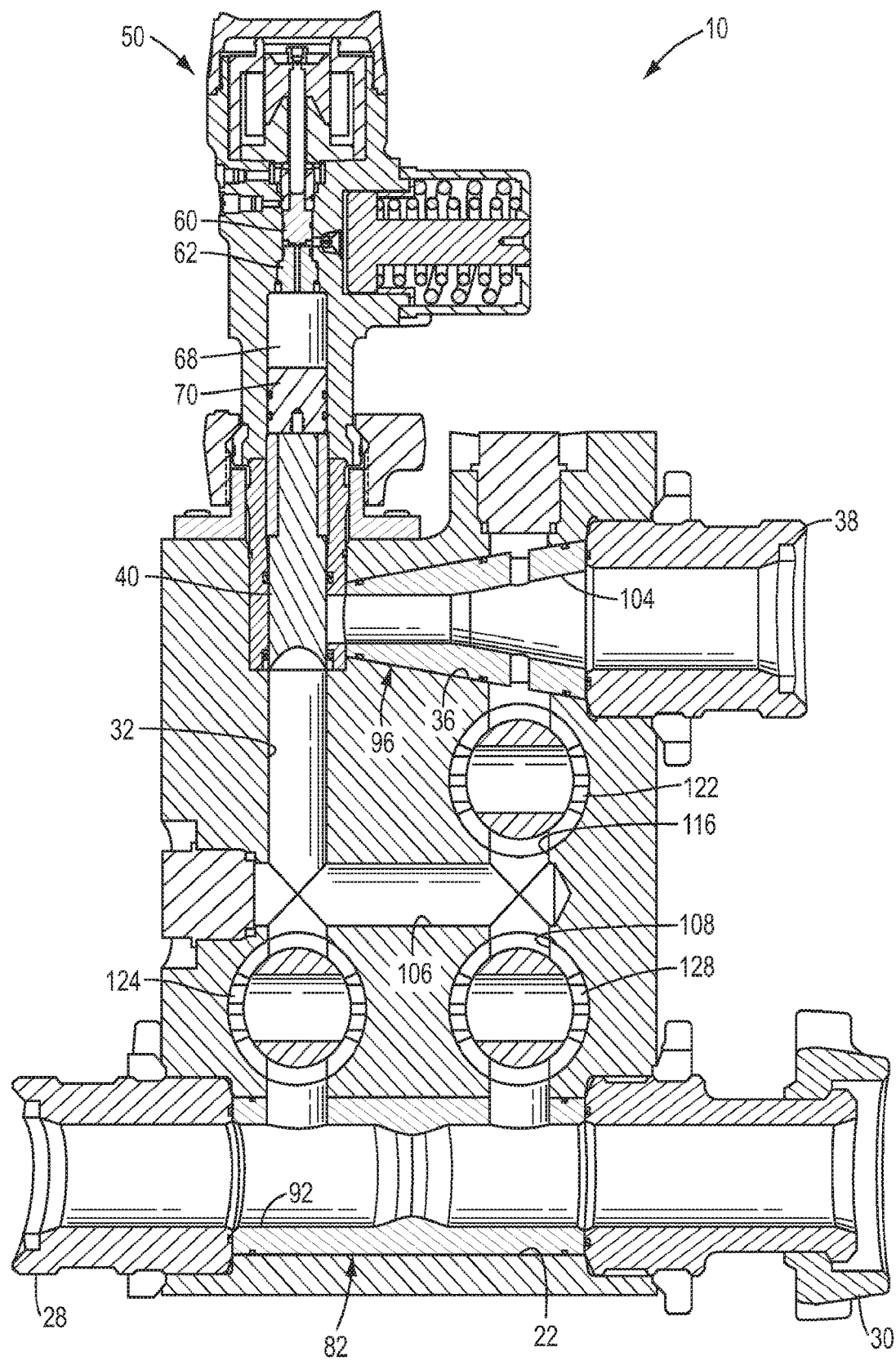
FIG. 5 is a cross sectional representation of the pressure relief valve of FIG. 1 shown during its reset mode.

Referring to FIG. 5, once the valve member 40 has returned to its closed position, the pilot valve 50 is activated to reseat the pilot piston 60 against the seat member 62 in order to trap the hydraulic fluid in the fluid chamber 68. As discussed above, the trapped hydraulic fluid will maintain the valve member 40 in the closed position against pressures in the main bore 22 (or the main flowpath 92) which are below the predetermined overpressure level. The first closure device 122 will then be closed to isolate the vent bore 116 from the outlet bore 36 (or the outlet flowpath 104), and the second and third closure devices will be opened to place the pressure relief valve 10 back in the normal operating condition.

Figure 6:
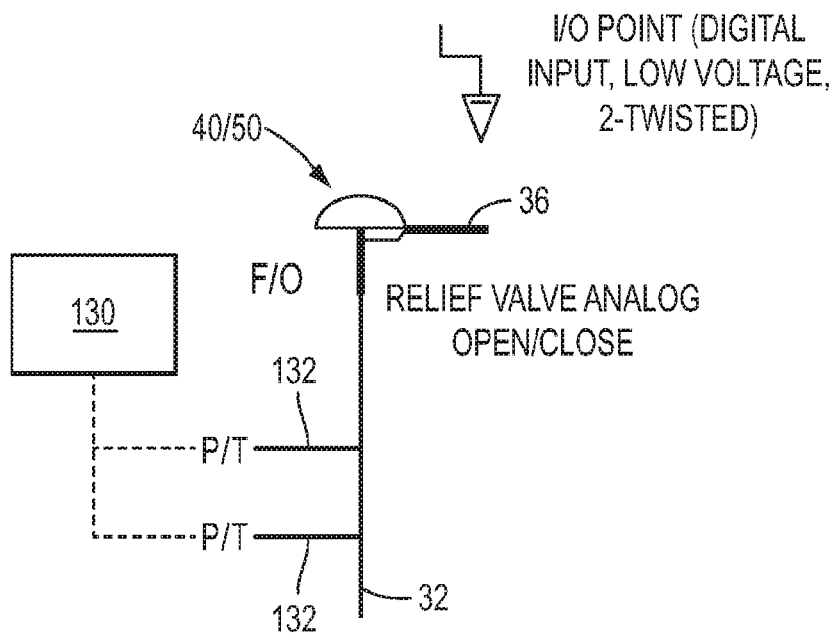
FIG. 6 is a schematic representation of a another embodiment of the pressure relief valve of the present disclosure.

Additional embodiments and variations of the pressure relief valve of the present disclosure will now be described with reference to FIGS. 6-12. FIG. 6 is a schematic view of an embodiment of a standalone pressure relief valve. In this embodiment, the valve member 40 is positioned between the inlet bore 32 and the outlet bore 36 and is controlled as described above by a solenoid operated pilot valve 50. The solenoid in the pilot valve 50 is operated by a controller 130, which receives pressure input from a number of pressure sensors 132 mounted, e.g., in the inlet bore 32. When the pressure sensors 132 indicate that the pressure in the inlet bore 32 is greater than the predetermined overpressure level, the controller 130 will deactivate the solenoid in the pilot valve 50 and allow the valve member 40 to open in the manner described above. In this embodiment, the pilot valve 50 is a fail open (F/O) valve. Accordingly, should power to the pilot valve 50 be lost, the solenoid will be deactivated and the valve member 40 will be able to open under normal pressures in the inlet bore 32.

Figure 7:
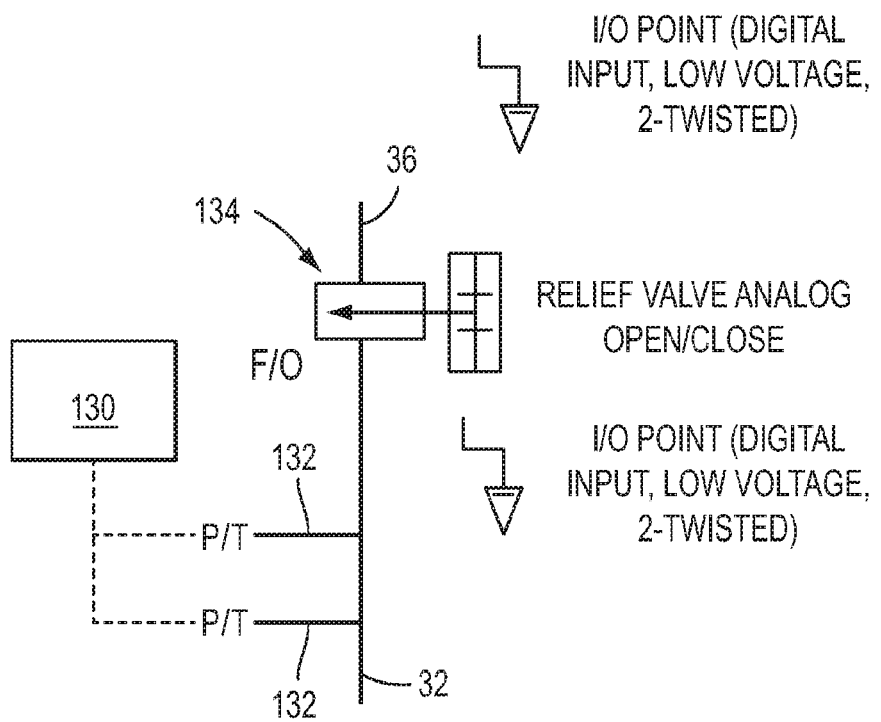
FIG. 7 is a schematic representation of a yet another embodiment of the pressure relief valve of the present disclosure.
Figure 12:
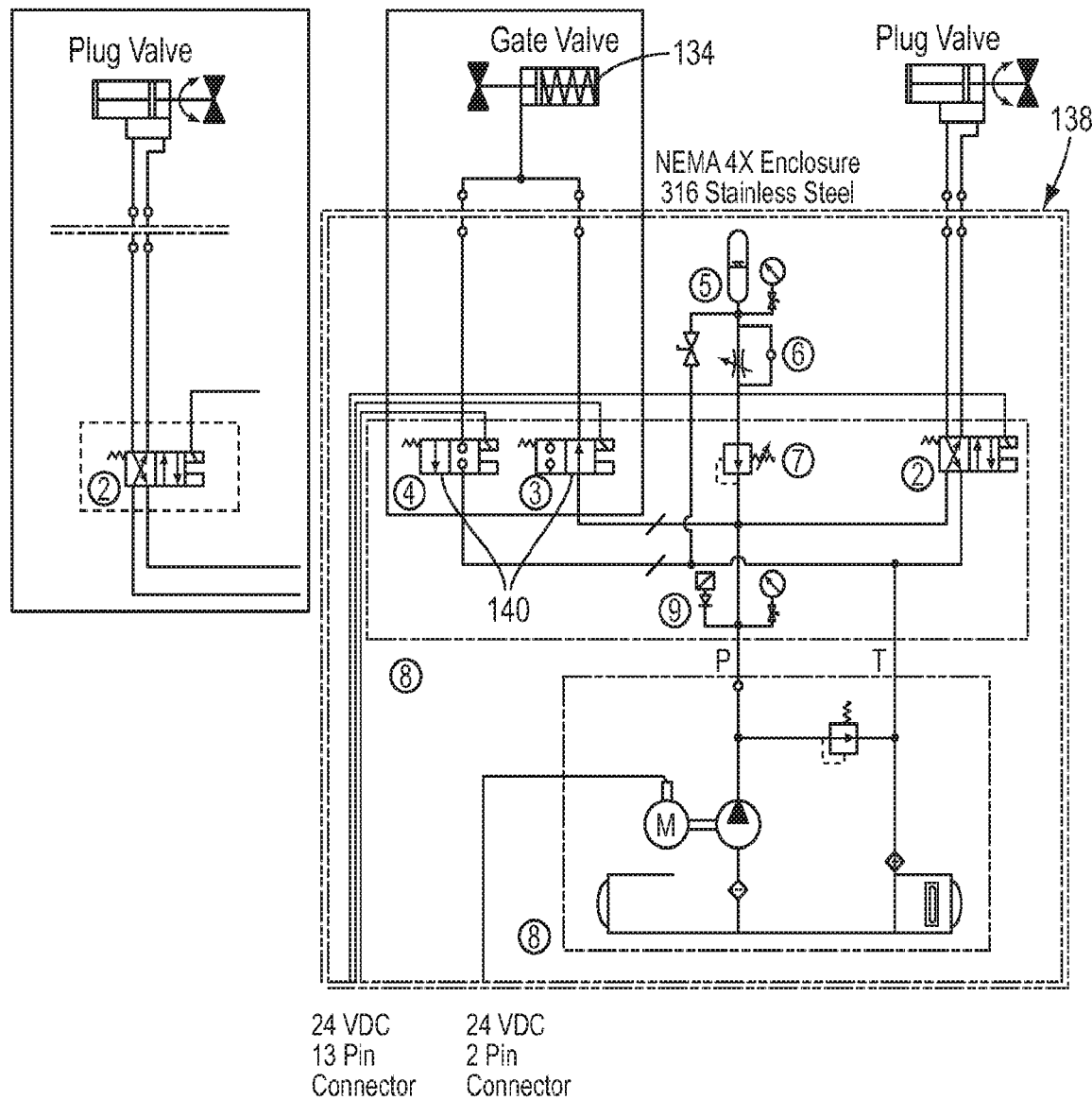
FIG. 12 is a schematic diagram of the control elements of the pressure relief valve of the present disclosure.

FIG. 7 is a schematic view of a standalone pressure relief valve which is similar to that shown in FIG. 6 but in which the poppet-type valve member 40 is replaced with a gate valve 134 whose gate member is operatively positioned between the inlet bore 32 and the outlet bore 36. The gate valve 134 may be controlled by the controller 130 in the manner illustrated in FIG. 12, for example. As shown in FIG. 12, the gate valve 134 is operated by a hydraulic pressure unit (HPU) 138 that controls two solenoid valves 140. These valves are used to hold the gate closed by powering the valves internal to the HPU. If power to these valves is removed, the gate valve 134 will be allowed to move to the open position to thereby relieve the pressure in the inlet bore 32. The advantage of using the gate valve 134 instead of the poppet-type valve member 40 described above is that the gate valve can be reclosed under pressure.

Figure 8:
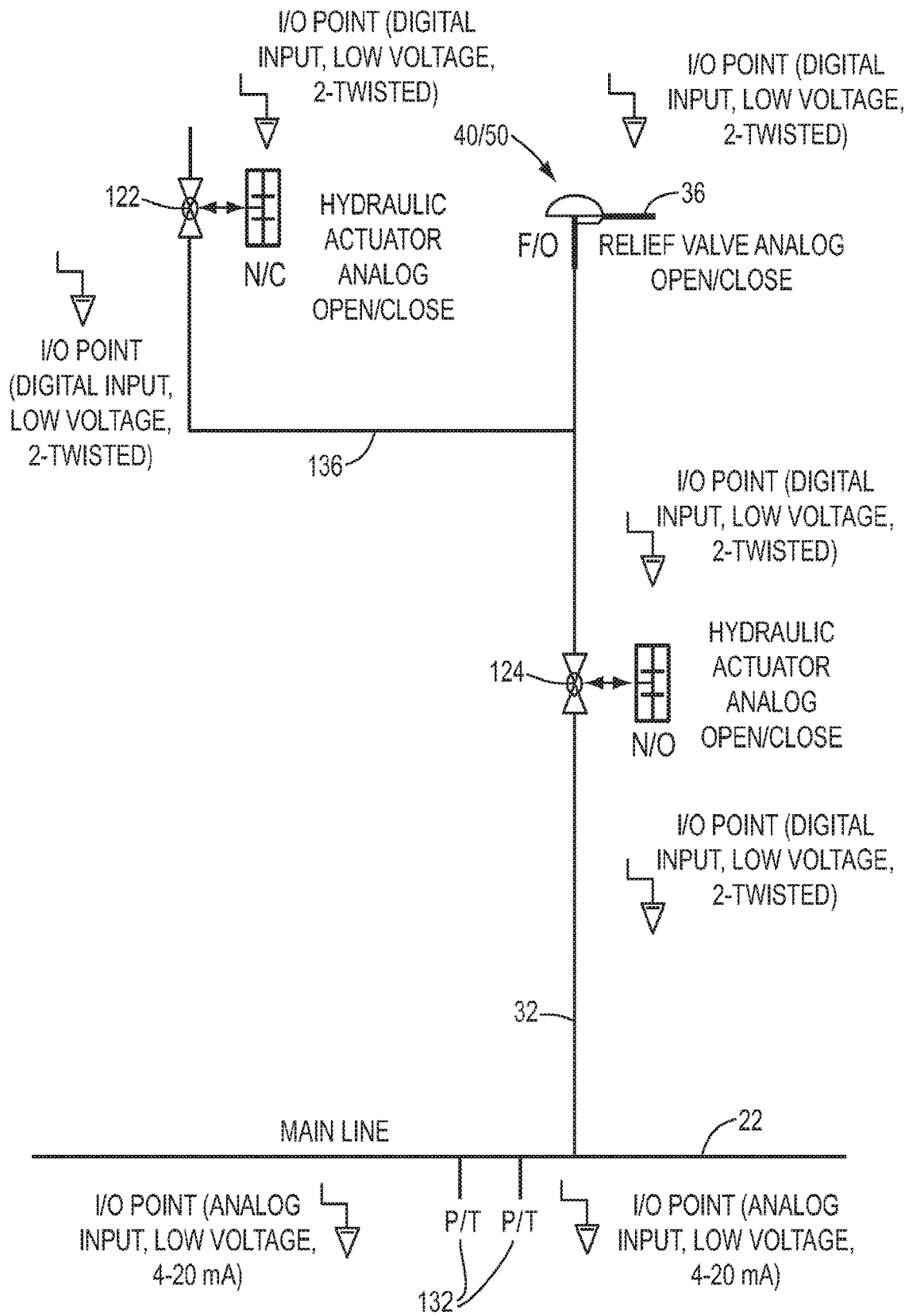
FIG. 8 is a schematic representation of a further embodiment of the pressure relief valve of the present disclosure.

FIG. 8 is a schematic view of an embodiment of the pressure relief valve which includes means for venting the inlet bore 32 prior to resetting the valve member 40. In this embodiment, the pressure in the inlet bore 32 is vented through a separate vent line 136 in which the closure device 122 is positioned. The vent line may be connected to the outlet bore 36 or to a separate vent line (not shown).

Figure 9:
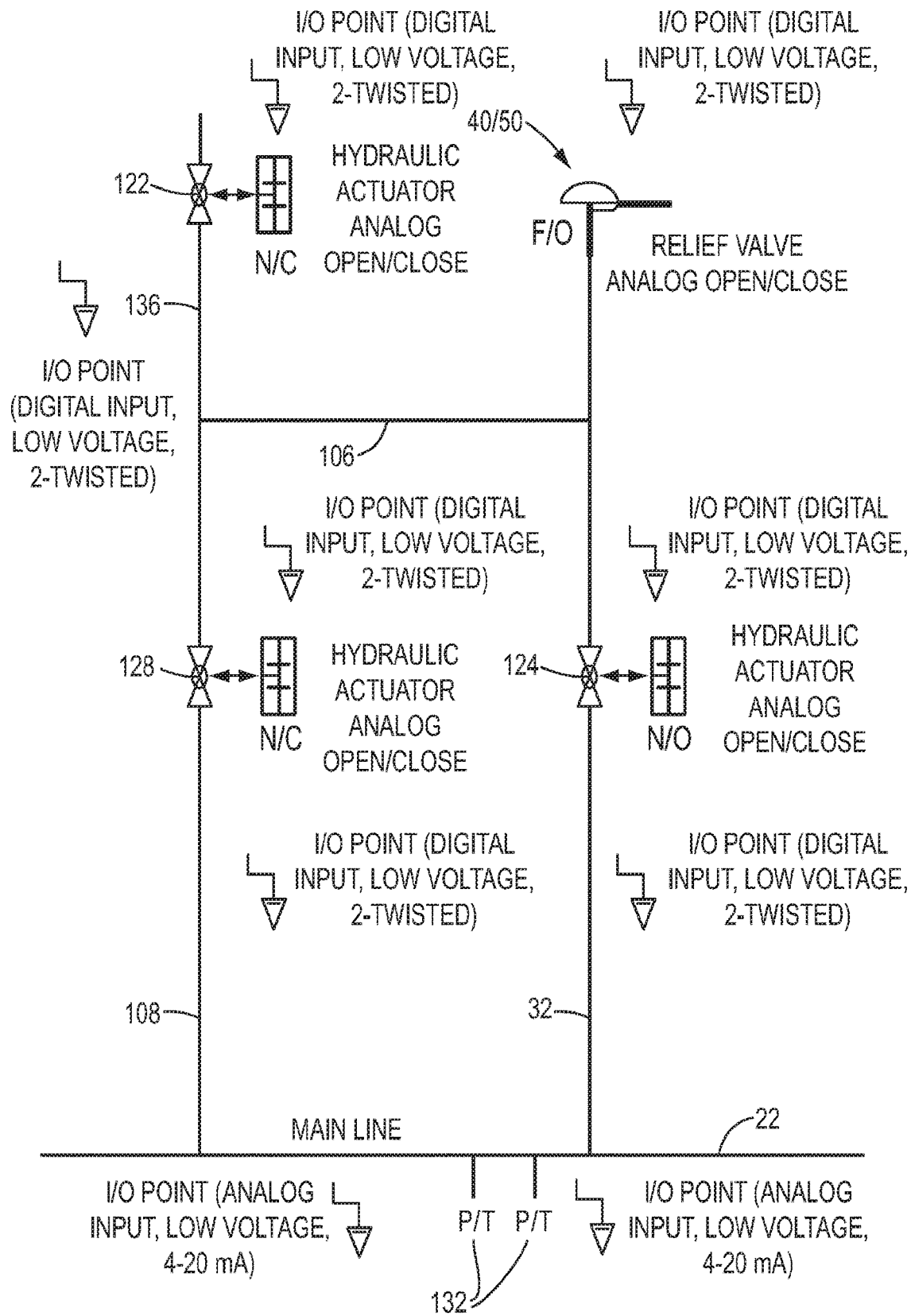
FIG. 9 is a schematic representation of yet a further embodiment of the pressure relief valve of the present disclosure showing the fluid circulation feature of the disclosure turned off.
Figure 10:
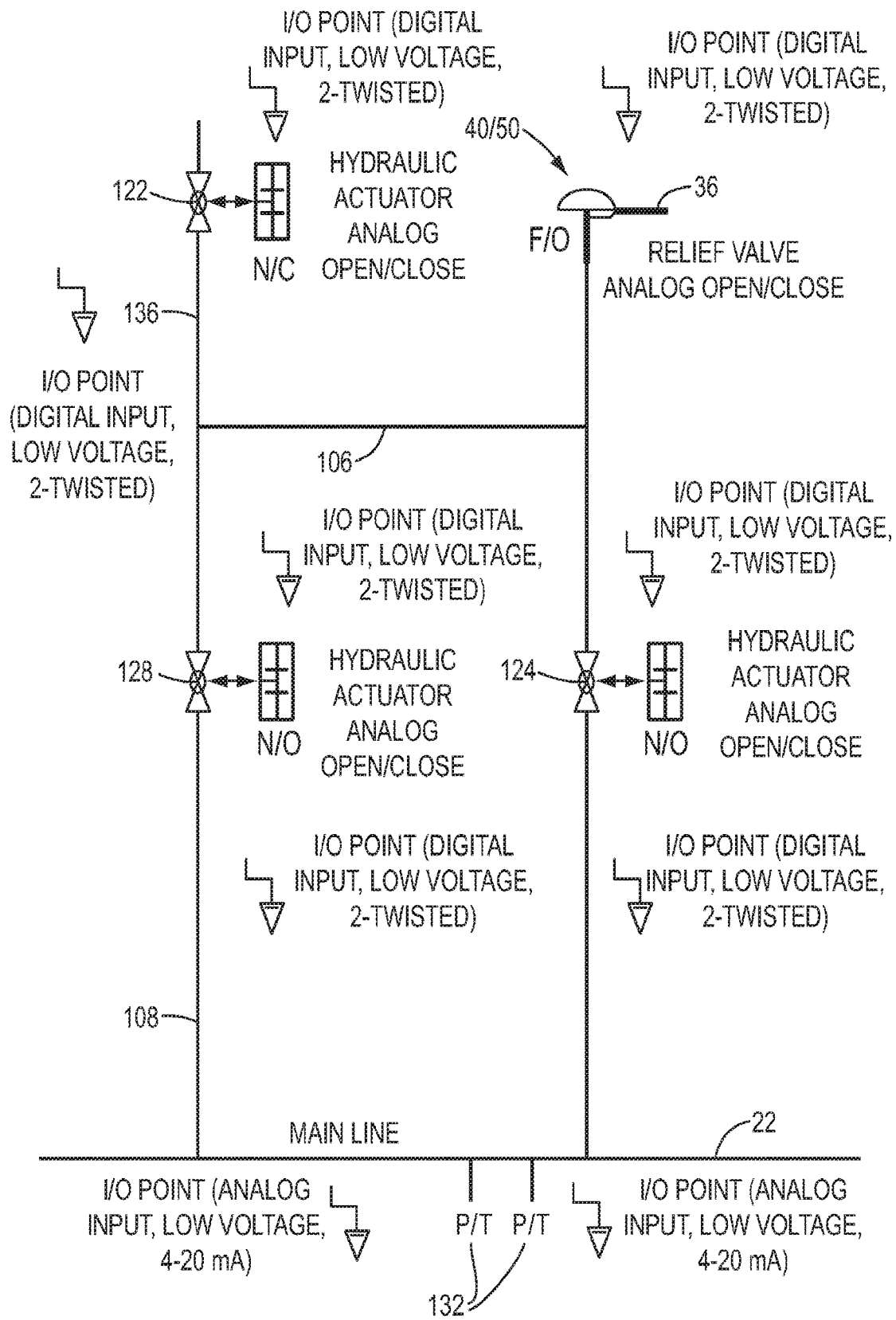

FIG. 9 is a schematic view of an embodiment of the pressure relief valve which includes both the means for venting the inlet bore 32 prior to resetting the valve member 40 and the means for circulating fluid in the main bore 32 through the inlet bore, the crossover bore 106, the return bore 108 and back into the main bore. In the embodiment shown in FIG. 9, the closure device 128 is shown in the closed position and the circulation function is accordingly turned off. FIG. 10 is an embodiment of the disclosure shown in FIG. 9 but with the closure device 128 in the open position and the circulation function accordingly turned on.

Figure 11:
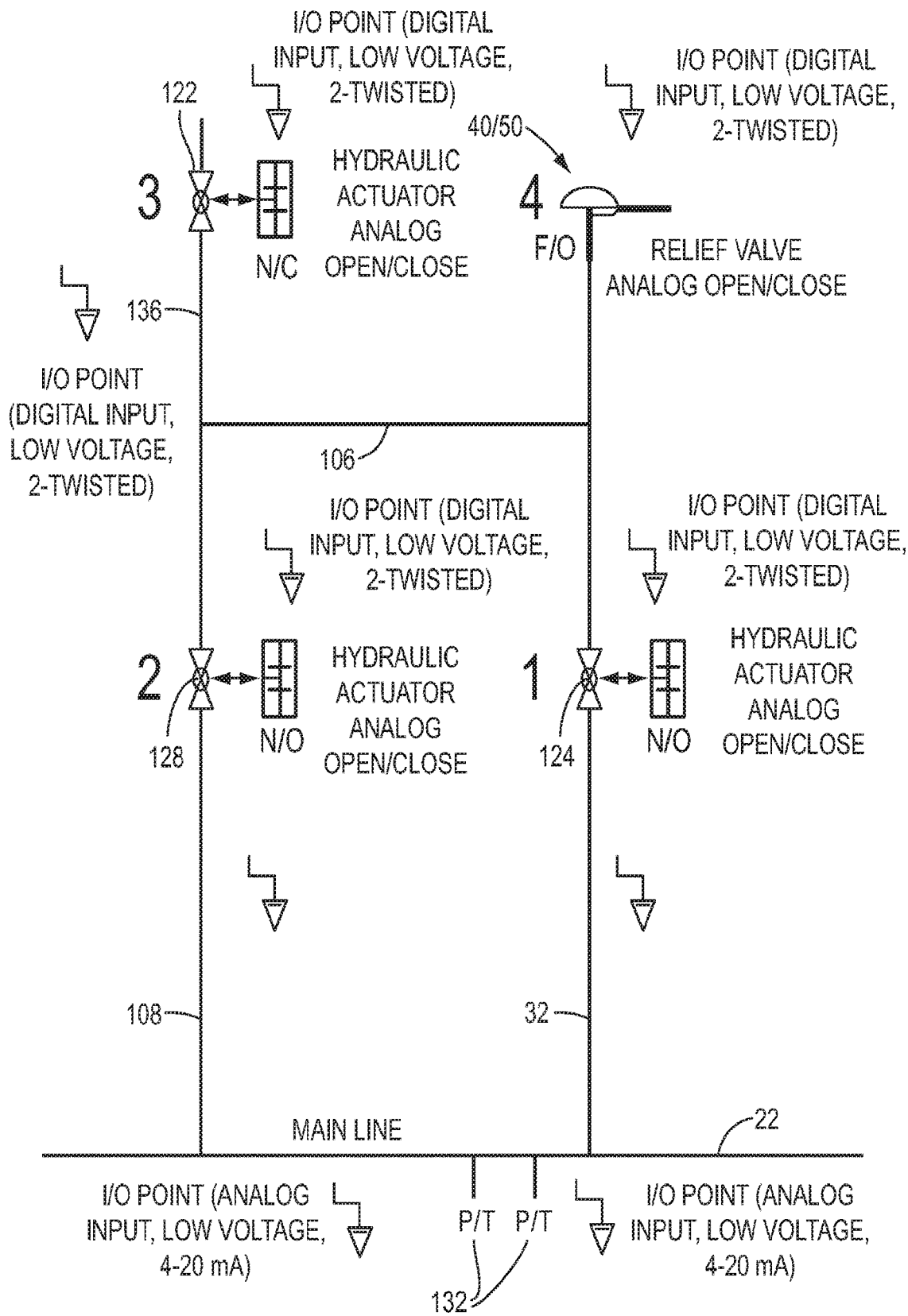
FIG. 11 is a schematic representation similar to FIG. 10 which illustrates one manner of operating the pressure relief valve of the present disclosure.

FIG. 11 is a schematic view similar to FIG. 10. In FIG. 11, item 1 is the closure device 124, which in this embodiment may be an isolation plug valve, whose primary function is to isolate the inlet bore 32 when needed. Item 4 is the valve member 40 and/or the pilot valve 50. During operation, the plug valve 1 can be used to isolate item 4 from the main bore 22 for repair or to reset item 4 (if the valve member requires 0 psi to reset). In this exemplary embodiment, the main bore pressure can be as high as 125 psi, and the valve member 40 may not be able to reseat against this pressure. If the circulation line 106/108 is present, item 2, which is the closure device 128, must also be closed to isolate the valve member 40 from the main bore pressure. Item 3 is the closure device 122, which in this embodiment is a plug valve. The closure device 122 can be opened to vent fluids trapped between items 1, 2, 3, and 4. At this point, items 1 and 2 can be verified as being fully closed. Once items 1 and 2 are closed, item 3 must be opened to allow item 4 to reseat.

After item 4 is reseated, the system will start the following sequence of events in one embodiment of the disclosure:
(1) Re-energize item 4 (24 volt dc signal);
(2) Close item 3 (validate closed position);
(3) Return item 2 to prior state (open for bypass or remain closed); and
(4) Open item 1.

HPU—Operations from Controller:
(1) Monitor Pressure of the HPU;
(2) Control pressure by turning on/off the boost pump;
(3) Control/status of isolation valve, gate valve, and other control valves.
(4) Input from HPU: pressure transducers (qty 2) 4-20 mA signals.
(5) Output to HPU: 24 volt DC digital on/off (qty 4).

As discussed above, the pilot valve 50 and the valve member 40/134 may be controlled by the controller 130 and closure devices 122, 124 and 128 may be operated by the HPU under the control of the controller 130. During operation, the valve member 40/134 will open when one of the two pressure transducers 132 is greater then the predetermined set point. Additional input from the user can require that the system relieve the main bore pressure if the rate of change of the main bore pressure, as measured by the pressure transducers, is greater than a first predetermined pressure within, e.g. 100 ms, and the main bore pressure is greater than a second predetermined pressure and below the set trip pressure. Also, the pressure relief valve may be provided with a main bore pressure reliease option in the event of a failure to the line, which may be indicated by a quick drop in main bore pressure.

Secondary Functions:

The pressure relief valve may use hydraulic actuators to change the state of the closure devices. This function is controlled by signals from the controller to the HPU. In this embodiment, the status of a closure device is taken back to the controller in the form of, e.g., proximity switches.

The Controller for the present disclosure may have the following features and operations:

Primary Function (Quick Response—Under 100 ms):
 (1) Monitor 2 pressure transducers and keep valve member closed (apply 24v DC signal to ePRV/HPU gate solenoid) below trip pressure set point (customer entered);
 (2) Open Relay to remove power to coil (relieving line pressure) to open relief valve;
 (3) Have an emergency Stop (Relieve) input from an e-stop source (digital input)

Secondary Function:
 (1) Monitor HPU if attached:
  a. INPUT to controller:
   i. 2 Pressure transducers (5000 psi) (4-20 mA).
  b. Outputs from controller:
   i. Relay wiring to control boost pump (relay can be at pump).
   ii. Relay for solenoid valves (3).
 (2) Remote control ability:
  a. Communication from main controller to a remote location (up to 150 ft. away):
   i. Modbus
   ii. Ethernet
   iii. Wi-Fi (secured)
  b. Status Screen for trouble shooting and setup.
  c. Data logging both on Control and for customer.
  d. Spanning controls for all analog inputs and outputs screen.
  e. Connection Status (screen showing connections)—populated to main run screen if change is detected.
  f. Items that will need to be communicated between main control and remote
   i. Set trip pressure.
   ii. Set rate of change and lower threshold for trip.
   iii. Reset pressure value (lock in pressure after relief).
    Note: This is used only when Gate valve is being used and selected in programming.
   iv. E-stop.
   v. Control of 3 plug valves (open/close) along with position (full open/close feedback).
   vi. Main control status (handshake between both units to make sure both main controller and remote are functioning).
   vii. Voltage from Battery backup and main source if connected.
   viii. Current to/from battery backup.
   ix. Reason for trip (trip pressure requirements met, rate increase requirements met, low voltage trip, open circuit trip, quick drop in pressure release met).
 (3) Monitor variations between frac line pressure transducers (customer entered) psi and deviation not more than (customer entered) psi.

(4) High visibility outdoor 3 Color LED at controller.
   a. Yellow/Red/Green (flashing)—System is not configured for job.
   b. Yellow—more than (customer input) psi on frac line.
   c. Yellow (flashing)—Isolation plug valve closed.
   d. Yellow (2 flash/pause)—Bypass valve not in correct position.
   e. Red (solid)—Battery backup.
   f. Red (slow flashing)—Critical Battery backup level (low voltage alarm).
   g. Red (fast flashing)—Relief valve function compromised (failure of component is possible).
      i. Low solenoid plunger level.
      ii. Voltage below critical level.
      iii. HPU Pressure below critical level.
      iv. Vent valve (3) is open (when it's to be closed).
      v. Secondary power supply circuit open or below critical.
   h. Green—System is ready, Battery level is good, primary power source is good.
   i. Green/Red (flashing)—System is ready, but battery or secondary source is charging (secondary source is above critical voltage).
(5) Valve monitoring:
   a. Isolation Plug Valve (1) open/closed—uses two proximity switches (with open circuit notification).
   b. Freeze/sand bypass valve (2) open/closed—uses two proximity switches (with open circuit notification).
   c. Vent Line (3)) open/closed—uses two proximity switches (with open circuit notification).
(6) Redundant processor—similar to safety PLCs.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A pressure relief valve comprising:
a valve body which includes a main bore having an inlet end and an outlet end, an inlet bore which is connected to the main bore at a first location, an outlet bore which extends through a side of the valve body, and a valve bore which connects the inlet bore with the outlet bore; and
a valve member which is positioned in the valve bore, the valve member being movable between a closed position in which a fluid in the inlet bore is prevented from flowing into the outlet bore and an open position in which the fluid in the inlet bore is permitted to flow into the outlet bore;
wherein the valve member is movable from the closed position to the open position in response to an overpressure event in the main bore;
the valve body further comprising a return bore which connects the inlet bore with the main bore, the return bore being connected to the main bore at a second location which is spaced apart from the first location.

2. The pressure relief valve of claim 1, further comprising a flow restrictor which is located in the main bore between the inlet bore and the return bore.

3. The pressure relief valve of claim 2, wherein the flow restrictor comprises a reduced diameter constriction in the main bore.

4. The pressure relief valve of claim 1, wherein the valve body further comprises a vent bore which is connected between the inlet bore and the outlet bore, and wherein the pressure relief valve further comprises:
a first closure device which is positioned in the vent bore; and
a second closure device which is positioned in the inlet bore between the main bore and the vent bore;
wherein in operation of the pressure relief valve, pressure in the valve bore is vented through the vent bore and the outlet bore by closing the second closure device and opening the first closure device.

5. The pressure relief valve of claim 4, wherein the vent bore is connected to the inlet bore via the return bore, and wherein the pressure relief valve further comprises:
a third closure device which is positioned in the return bore between the main bore and the vent bore;
wherein in operation of the pressure relief valve, pressure in the valve bore is vented through the vent bore and the outlet bore by closing the second and third closure devices and opening the first closure device.

6. The pressure relief valve of claim 5, wherein the valve body comprises a generally rectangular block configuration.

7. The pressure relief valve of claim 6, wherein the main bore extends generally horizontally through the body, the inlet bore extends generally vertically through the body from the main bore, the valve bore extends generally vertically through the body from an end of the inlet bore opposite the main bore, and the outlet bore extends generally horizontally through the body from the vale bore.

8. The pressure relief valve of claim 7, wherein the return bore extends generally vertically through the valve body from the main bore and is connected to the inlet bore by a generally horizontally extending cross bore.

9. The pressure relief valve of claim 8, wherein the vent bore extends generally vertically through the valve body from the outlet bore and is connected to the inlet bore by the cross bore.

10. The pressure relief valve of claim 9, wherein at least one of the valve bore and the vent bore is formed coaxially with the inlet bore and the return bore, respectively.

11. The pressure relief valve of claim 5, wherein at least one of the main bore and the outlet bore comprises a bore liner.

12. The pressure relief valve of claim 11, wherein at least one of the inlet bore, the return bore, the cross bore and the vent bore comprises a bore liner.

13. A pressure relief valve comprising: a valve body which includes a main bore having an inlet end and an outlet end, an inlet bore which is connected to the main bore, an outlet bore which extends through a side of the valve body, and a valve bore which connects the inlet bore with the outlet bore; and a valve member which is positioned in the valve bore, the valve member being movable between a closed position in which a fluid in the inlet bore is prevented from flowing into the outlet bore and an open position in which the fluid in the inlet bore is permitted to flow into the outlet bore; wherein the valve member is movable from the closed position to the open position in response to an overpressure event in the main bore; and wherein the valve body comprises a generally rectangular block configuration; and wherein the main bore extends generally horizontally through the body, the inlet bore extends generally vertically through the body from the main bore, the valve bore extends generally vertically through the body from an end of the inlet bore opposite the main bore, and the outlet bore extends generally horizontally through the body from the vale bore;

and wherein the valve body further comprises a vent bore which is connected between the inlet bore and the outlet bore, and wherein the pressure relief valve further comprises: a first closure device which is positioned in the vent bore; and a second closure device which is positioned in the inlet bore between the main bore and the vent bore; wherein in operation of the pressure relief valve, pressure in the valve bore is vented through the vent bore and the outlet bore by closing the second closure device and opening the first closure device.

14. The pressure relief valve of claim 13, wherein the inlet bore is connected to the main bore at a first location and the valve body further comprises a return bore which connects the inlet bore with the main bore, the return bore being connected to the main bore at a second location which is spaced apart from the first location.

15. The pressure relief valve of claim 14, wherein the return bore extends generally vertically through the valve body from the main bore and is connected to the inlet bore by a generally horizontally extending cross bore.

16. The pressure relief valve of claim 15, wherein the vent bore extends generally vertically through the valve body from the outlet bore and is connected to the inlet bore by the cross bore.

17. The pressure relief valve of claim 16, wherein at least one of the valve bore and the vent bore is formed coaxially with the inlet bore and the return bore, respectively.

18. The pressure relief valve of claim 14, further comprising a flow restrictor which is located in the main bore between the inlet bore and the return bore.

19. The pressure relief valve of claim 18, wherein the flow restrictor comprises a reduced diameter constriction in the main bore.

20. The pressure relief valve of claim 13, wherein the valve body further comprises a return bore which connects the inlet bore with the main bore, wherein the vent bore is connected to the inlet bore via the return bore, and wherein the pressure relief valve further comprises: a third closure device which is positioned in the return bore between the main bore and the vent bore; wherein in operation of the pressure relief valve, pressure in the valve bore is vented through the vent bore and the outlet bore by closing the second and third closure devices and opening the first closure device.

* * * * *